Jan. 10, 1939.     G. L. DIMMICK     2,143,059
OPTICAL SYSTEM FOR REDUCTION FILM PRINTERS
Filed Dec. 30, 1936
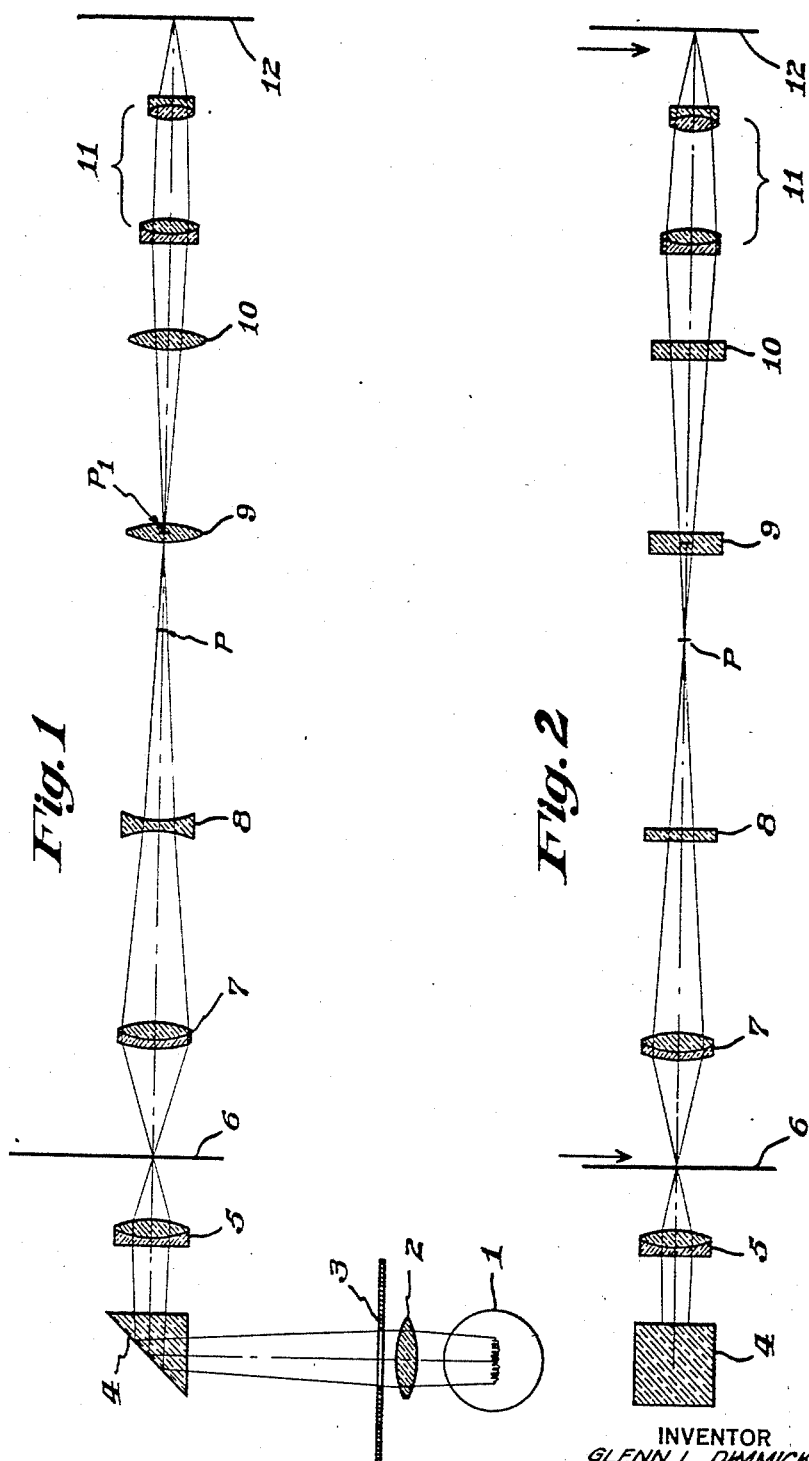

Patented Jan. 10, 1939

2,143,059

UNITED STATES PATENT OFFICE 2,143,059

OPTICAL SYSTEM FOR REDUCTION FILM PRINTERS

Glenn L. Dimmick, Erlton, N. J., assignor to Radio Corporation of America, a corporation of Delaware Application December 30, 1936, Serial No. 118,189

1 Claim. (Cl. 88—24)

This invention relates to an optical system for optical reduction printers and, more particularly, to the type of optical system used in printing sound track from 35 millimeter film to 16 millimeter film, and wherein the image must be reduced in different ratios in different directions.

The invention involves a novel combination of spherical and cylindrical lenses which forms an intermediate image of one film, which is, in turn, reimaged on the other film in such a manner that the apparent movement of both film images is in the same direction, thereby permitting movement of both films in the same direction during the printing operation.

One object of the invention is to provide a novel means for uniformly illuminating a predetermined area of the sound track which is to be printed.

Another object of the invention is to provide an optical system for an optical reduction printer which causes both film images to move in the same direction, thereby permitting the use of similar film-feeding mechanisms at both ends of the printer.

Another object of the invention is to provide an optical system which will reduce the sound track image in the direction of the film motion in the same ratio as the relative film lengths, and which will simultaneously reduce the image laterally of the film in the same ratio as the sound track widths.

In the foregoing objects of the invention and in the following specification, it should be understood that the optical system is reversible and that the term "reduction" is used only to refer to the most usual manner of use of the system, which is equally well adapted for enlarging. In commercial practice, however, it is customary to originally record on the larger size of film and then to print a reduced image thereof, in order to secure a high degree of definition which could not be secured on the larger film, if enlarged from the smaller film, to the same degree as when the reverse process is used.

The invention will be better understood from a reading of the following specification and an inspection of the accompanying drawing, in which Figure 1 is a horizontal section through the optical system, as customarily installed in a printer, and wherein the direction of the film movement is perpendicular to the plane of the paper, and Figure 2 is a section of my optical system taken perpendicularly to the section shown in Fig. 1.

Referring to Fig. 1:

An appropriate printing lamp 1 is provided, which is preferably of the incandescent coil-filament type. The light from this filament is focused by the spherical condenser 2 upon the spherical lens 5 and is bent at an angle of 90 degrees by the prism 4. A rectangular aperture 3 is provided, which is imaged upon the film 6 by the spherical lens 5, which is illustrated as a simple achromat. The condenser 2, which is focused upon the lens 5, shows an even illumination of the aperture 3, while the lens 5 imaging the aperture 3 upon the film defines a uniform rectangular area of the film which is illuminated.

Referring now to Fig. 2:

The lens 7 images the sound track on the film 6 at the point P and the compound objective 11 images at point P on the smaller film 12. The reduction ratio in this plane is 2½ to 1, which corresponds to the relative film speeds of 90 feet per minute for 35 millimeter film and 36 feet per minute for 16 millimeter film. It will be apparent that the cylindrical lenses 8, 9 and 10 have only the effect of glass plates on the image in this plane.

Referring again to Fig. 1:

The lens 7, as in Fig. 2, tends to form an image at the point P. This image, however, is advanced by the double concave cylindrical lens 8 from the point P to the point $P_1$ in the lens 9, and the image is enlarged in this plane in the ratio of these two distances from the lens 7. The lens 9, which is placed at this image plane, serves to concentrate the light, so that it will all be transmitted through the lens 11. It, however, has no effect upon the image itself, which falls within the lens.

The positive cylindrical lens 10 forms a virtual image of the image $P_1$ at the point P, which is in the proper position to be focused on the film 12 by the compound objective 11. In forming this virtual image at the point P, however, this lens 10 adds to the enlargement thereof which was accomplished by the lens 8, and this enlarged virtual image of the enlarged image $P_1$ is then focused upon the film 12 by the objective 11. It will be apparent that in this plane the reduction ratio of the image is considerably less than in the plane shown in Fig. 2, and, in the form of the invention shown, the reduction ratio laterally of the film is 7 to 6, corresponding to the sound track widths of .070 inch on the 35 millimeter film and .060 inch on the 16 millimeter film.

Due to the usual inversion produced when a real image is formed by a simple positive lens system, the image at P in Fig. 2 moves in the opposite direction to the movement of the film 6, while this movement of the image is again inverted by the objective 11, and the real image then produced upon the film 12 therefore moves in the same direction as the movement of the film 6, thereby permitting movement of both of the films in the same direction. This arrangement permits a simplified mechanical construction of the apparatus in that both films may be fed downwardly through the aperture. Both take-up reels are at the bottom, and pull-down sprockets or drums for both films can likewise be below the printing point, thereby permitting the two printing heads for feeding the 35 and 16 millimeter films respectively to have an enantiomorphic relation to each other, while if no intermediate image were produced, one head or the other would have to be inverted. It will be apparent that my invention is not limited to reduction printing but that it may also be used for enlargement, and it is not limited to the specific ratios stated since, by appropriate choice of lenses, any reduction ratio desired may be secured in either direction.

Having now described my invention, I claim:

An optical system of the class described comprising a light source, a condenser lens, an aperture, a positive lens imaging said aperture on the film to be printed, the said condenser lens directing light from said light source to said positive lens, and means for imaging said film onto film stock including two positive spherical lens systems forming an erect reduced image in one plane and a plurality of cylindrical lenses effective only in a plane perpendicular to said first plane and providing a different ratio of reduction in said second plane, the first of said positive spherical lens systems forming an inverted image and the second of said systems erecting said image onto said second film, and the said cylindrical lenses including a negative lens between said first positive lens and the inverted image for enlarging said image, a positive cylindrical lens between said image and the second of the positive spherical lenses for further enlarging said image, and a condenser in the plane of the image formed by the first positive lens and negative cylindrical lens for condensing light into the second positive spherical lens.

GLENN L. DIMMICK.